(12) United States Patent
Nemoto

(10) Patent No.: US 9,746,809 B2
(45) Date of Patent: Aug. 29, 2017

(54) EDGE DETECTION APPARATUS, IMAGE FORMING APPARATUS, AND EDGE DETECTING METHOD FOR DIVIDING AND SENDING OUT EDGE DETECTION DATA

(71) Applicant: Masakazu Nemoto, Ibaraki (JP)

(72) Inventor: Masakazu Nemoto, Ibaraki (JP)

(73) Assignee: RICOH COMPANY, LTD., Tokyo (JP)

( * ) Notice: Subject to any disclaimer, the term of this patent is extended or adjusted under 35 U.S.C. 154(b) by 205 days.

(21) Appl. No.: 14/571,426

(22) Filed: Dec. 16, 2014

(65) Prior Publication Data

US 2015/0177662 A1 Jun. 25, 2015

(30) Foreign Application Priority Data

Dec. 24, 2013 (JP) ................. 2013-265753

(51) Int. Cl.
 *G03G 15/00* (2006.01)
 *H04N 1/00* (2006.01)
(52) U.S. Cl.
 CPC ..... *G03G 15/6561* (2013.01); *H04N 1/00681* (2013.01); *G03G 2215/00616* (2013.01); *G03G 2215/00721* (2013.01); *G03G 2215/0129* (2013.01)
(58) Field of Classification Search
 CPC ..... G03G 15/6561; G03G 2215/00616; G03G 2215/0129; G03G 2215/00721; H04N 1/00681; H04N 1/00687; H04N 1/00702; H04N 1/00689; H04N 1/0079; H04N 1/00737; H04N 1/00734; H04N 1/00745; H04N 1/00748

USPC ...... 250/221, 559.01, 559.29, 559.36, 559.3, 250/559.05, 559.04, 559.06
See application file for complete search history.

(56) References Cited

U.S. PATENT DOCUMENTS 4,789,903 A * 12/1988 Kamada ............ H04N 1/00567
 358/296
6,788,322 B2 * 9/2004 Morita ................. G06K 9/3283
 347/139

FOREIGN PATENT DOCUMENTS

JP 2007-119135 5/2007

* cited by examiner

*Primary Examiner* — Que T Le
*Assistant Examiner* — Jennifer Bennett
(74) *Attorney, Agent, or Firm* — Oblon, McClelland, Maier & Neustadt, L.L.P.

(57) ABSTRACT

An edge detection apparatus for detecting an edge of a recording medium to be conveyed includes a light source, a plurality of photoelectric conversion element pixels, and a detection unit. The light source irradiates the recording medium with light. The plurality of photoelectric conversion element pixels are placed in a direction orthogonal to a conveyance direction of the recording medium and convert light reflected by the recording medium into an electrical signal. The detection unit detects the edge of the recording medium on the basis of a plurality of electrical signals that constitute an n-th (n≥1) electrical signal group obtained by dividing the plurality of electrical signals corresponding one-to-one to the plurality of photoelectric conversion element pixels, and a specified number of the electrical signals counted from a top of the plurality of electrical signals that constitute an n+1st electrical signal group.

9 Claims, 4 Drawing Sheets

EDGE DETECTION APPARATUS, IMAGE FORMING APPARATUS, AND EDGE DETECTING METHOD FOR DIVIDING AND SENDING OUT EDGE DETECTION DATA

CROSS-REFERENCE TO RELATED APPLICATIONS

The present application claims priority to and incorporates by reference the entire contents of Japanese Patent Application No. 2013-265753 filed in Japan on Dec. 24, 2013.

BACKGROUND OF THE INVENTION

1. Field of the Invention

The present invention relates to an edge detection apparatus, an image forming apparatus, and an edge detecting method.

2. Description of the Related Art

In electrophotographic image forming apparatuses, there is conventionally known a technology to detect an end portion (which is referred to as "an edge" in the following description) in a width direction of a transfer sheet. An edge position of the transfer sheet is detected by, for example, an optical detection unit, such as a contact image sensor (which is referred to as "CIS" is the following descriptions) placed in a conveying path of the transfer sheet (for example, Japanese Patent No. 4794979 etc.). Based on the detected edge position of the transfer sheet, a shift amount of a document in the width direction (which is referred to as "main-scanning direction" in the following descriptions) is calculated so as to adjust a transfer position on the basis of the transfer sheet or to adjust the position of the transfer sheet on the basis of the transfer position for achieving correction in the main-scanning direction for each transfer sheet. Moreover, a skew amount is calculated on the basis of the detected edge of the transfer sheet. These technologies have already been known, and in the case of detecting the edge of the transfer sheet by using these technologies, an influence of paper powder generated during conveyance of the transfer sheet needs to be eliminated. For this, a technology to perform dust removal processing is known.

Moreover, for high-speed transfer of data (data for edge detection) read with, for example, a CIS, a technology to divide and send out the data read by the CIS is also known.

However, according to an edge detection method disclosed in, for example, Japanese Patent No. 4794979, when the data read by the CIS is divided and sent out, continuous output of an output value indicative of the presence of a transfer sheet is interrupted at boundaries of divided CIS data. This makes it impossible to perform accurate edge detection.

In view of the above-stated circumstances, there is a need to provide an edge detection apparatus, an image forming apparatus, and an edge detecting method, capable of performing accurate edge detection even when data for edge detection is divided and sent out.

SUMMARY OF THE INVENTION

It is an object of the present invention to at least partially solve the problems in the conventional technology.

According to the present invention, there is provided an edge detection apparatus for detecting an edge of a recording medium to be conveyed, comprising: a light source that irradiates the recording medium with light; a plurality of photoelectric conversion element pixels that are placed in a direction orthogonal to a conveyance direction of the recording medium and convert the light reflected by the recording medium into an electrical signal; and a detection unit that detects the edge of the recording medium on the basis of the plurality of electrical signals that constitute an n-th ($n \geq 1$) electrical signal group obtained by dividing the plurality of electrical signals corresponding one-to-one to the plurality of photoelectric conversion element pixels, and a specified number of the electrical signals counted from a top of the plurality of electrical signals that constitute an n+1st electrical signal group.

The present invention also provides an image forming apparatus, comprising the edge detection apparatus mentioned above.

The present invention also provides an edge detecting method for detecting an edge of a recording medium to be conveyed, the method comprising a detecting step of detecting the edge of the recording medium on the basis of a plurality of electrical signals that constitute an n-th ($n \geq 1$) electrical signal group, and a specified number of the electrical signals counted from a top of the plurality of electrical signals that constitute an n+1st electrical signal group, each of the electrical signal groups being obtained by dividing the plurality of electrical signals corresponding one-to-one to a plurality of photoelectric conversion element pixels, the plurality of photoelectric conversion element pixels being placed in a direction orthogonal to a conveyance direction of the recording medium to convert light of a light source emitted to and reflected by the recording medium into an electrical signal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
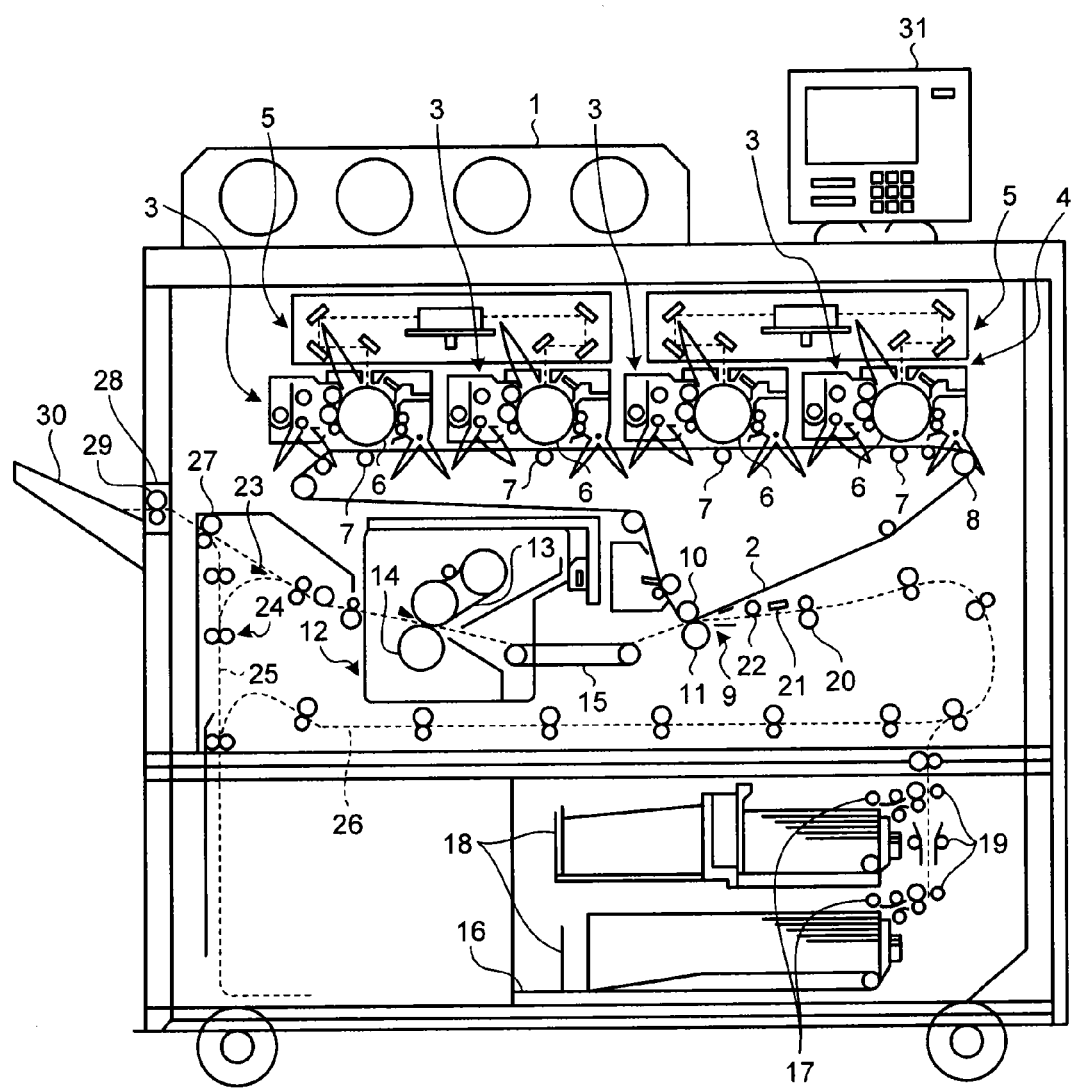
FIG. 1 is a diagram illustrating one example of the configuration of an image forming apparatus of an embodiment of the present invention.

Hereinafter, an embodiment of an edge detection apparatus, an image forming apparatus, and an edge detecting method of the present invention will be described in detail with reference to the accompanying drawings. FIG. 1 illustrates one example of the configuration of an image forming apparatus 1 of this embodiment. As illustrated in FIG. 1, the image forming apparatus 1 has an endless belt-type intermediate transfer belt 2 provided in a central area. The intermediate transfer belt 2 is stretched over a plurality of support rollers so as to allow rotational conveyance performed clockwise in the drawing. On the intermediate transfer belt 2, a plurality of image forming units 3 are placed along a conveyance direction side by side in a cross direction (horizontal direction) to form a tandem image forming apparatus 4. Above the tandem image forming apparatus 4, an exposure device 5 is provided as illustrated in FIG. 1.

Each of the image forming units 3 in the tandem image forming apparatus 4 has a photoconductor drum 6 as an image bearer which bears a toner image of each color. At a primary transfer position where the toner image is transferred from the photoconductor drum 6 to the intermediate transfer belt 2, a primary transfer roller 7 as a component member of a primary transfer unit is provided so as to face each of the photoconductor drums 6 across the intermediate transfer belt 2. A support roller 8 is a driving roller that rotationally drives the intermediate transfer belt 2.

A secondary transfer device 9 is provided on the opposite side of the tandem image forming apparatus 4 across the intermediate transfer belt 2. In the example illustrated in FIG. 1, the secondary transfer device 9 presses the secondary transfer roller 11 against the secondary transfer counter rollers 10 while a transfer electric field is applied thereto, so that the image on the intermediate transfer belt 2 is transferred to an unillustrated transfer sheet (corresponding to the "recording medium" in the claims of the present application). Although the transfer sheet is taken as an example of the "recording medium" in the claims of the present application in the following description, the "recording medium" in the claims is not limited thereto. In the secondary transfer device 9, a transfer current of the secondary transfer roller 11 that is a transfer condition parameter is changed depending on the transfer sheets. A fixing mechanism unit 12 which thermally welds transferred images (toner images) on the transfer sheets is provided beside the secondary transfer device 9. The fixing mechanism unit 12, which includes a halogen lamp (not illustrated) as a heat source, is configured to press a pressure roller 14 against a fixing belt 13 that is an endless belt.

The fixing mechanism unit 12 changes fixing condition parameters depending on the transfer sheets, the parameters including temperatures of the fixing belt 13 and the pressure roller 14, a nip width between the fixing belt 13 and the pressure roller 14, and a speed of the pressure roller 14. The transfer sheet having an image transferred thereto is conveyed to the fixing mechanism unit 12 with the conveying belt 15.

Operation of the image forming apparatus 1 is as follows. First, when image data is sent to the image forming apparatus 1 and an image formation starting signal is received, an unillustrated drive motor rotationally drives the support roller 8 to cause follower rotation of a plurality of other support rollers, whereby the intermediate transfer belt 2 is rotationally conveyed. At the same time, the individual image forming units 3 form monochrome images on the respective photoconductor drums 6. With conveyance operation of the intermediate transfer belt 2, those monochrome images are transferred one by one by the primary transfer roller 7, and a combined color image is formed on the intermediate transfer belt 2.

One of feed rollers 17 of a feed table 16 is selectively rotated so as to feed a transfer sheet from one of paper cassettes 18. The fed transfer sheet is conveyed by the conveying roller 19, and is stopped as the transfer sheet comes into contact with the registration roller 20. The registration roller 20 is rotated in synchronization with the timing of the combined color image on the intermediate transfer belt 2. A CIS 21 irradiates the transfer sheet passing a conveying path with light, and receives reflected light reflected by the transfer sheet. Based on the received reflected light, the edge of the transfer sheet passing through the conveying path is detected. Based on a resist shift amount in a main-scanning direction calculated with use of the detected edge of the transfer sheet, the transfer sheet is driven to be shifted in the main-scanning direction with the shift roller 22, so that the position of the transfer sheet is corrected.

The color image is transferred onto the position-corrected transfer sheet in the secondary transfer device 9. The transfer sheet with the image transferred thereon is conveyed by the secondary transfer device 9 and is sent to the fixing mechanism unit 12, where heat and pressure are applied to perform fusion welding of the transferred image. Then, in the case of performing double-side printing, the transfer sheet is conveyed to a paper sheet inverting path 25 and a double-sided conveying path 26 by using a bifurcating claw 23 and a flip roller 24. Accordingly, the combined color image is recorded on the back side of the transfer sheet by the method described before. In the case of inverting the transfer sheet, the transfer sheet is conveyed to the paper sheet inverting path 25 with the bifurcating claw 23, and the transfer sheet is conveyed to a paper ejecting roller 27 with the flip roller 24 so as to invert the front face and rear face of the transfer sheet. In the case where the paper sheet is not inverted, the transfer sheet is conveyed to the paper ejecting roller 27 with the bifurcating claw 23. Then, the transfer sheet is conveyed to a decurler unit 28 with the paper ejecting roller 27. In the decurler unit 28, a decurler amount that is a paper feed evaluation parameter is changed depending on the transfer sheets. The decurler amount is adjusted by changing the pressure of a decurler roller 29. The transfer sheet is ejected to a paper receiving tray 30 with the decurler roller 29. An operator panel 31 is provided on the upper side of the image forming apparatus 1 for customers (users) to perform various settings such as print setting and operations.

Figure 2:
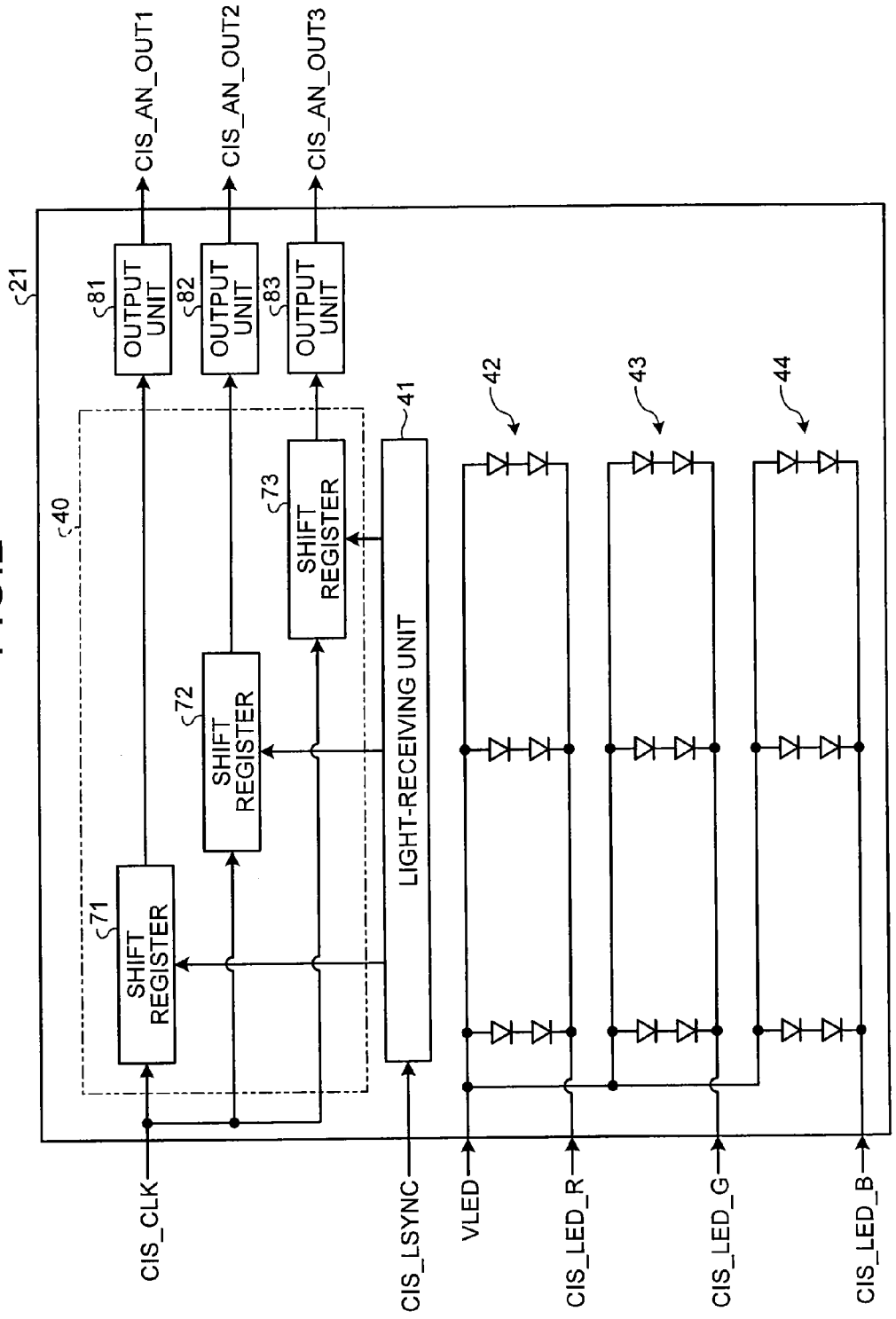
FIG. 2 is a diagram illustrating one example of the configuration of a CIS included in the image forming apparatus.

FIG. 2 illustrates one example of the configuration of the CIS 21. Although the case where the CIS 21 divides data (data for edge detection) into three data pieces and outputs the divided data pieces will be described as an example, the present embodiment is not limited thereto. The data may be divided into an arbitrary number of data pieces. As illustrated in FIG. 2, the CIS 21 includes a shift register unit 40, a light-receiving unit 41, and light source units 42, 43, and 44.

The shift register unit 40 includes three shift registers (71, 72, 73) corresponding one-to-one to the three data pieces. The light-receiving unit 41 is configured to include a plurality of photoelectric conversion element pixels (which may be referred to as "pixels" in the following description) placed in a direction orthogonal to a conveyance direction (main-scanning direction) of the transfer sheet to convert the light reflected by the transfer sheet into an electrical signal.

In the example of FIG. 2, each of the light source units 42, 43, and 44 is made of an LED. In the example of FIG. 2, when a CIS_LED_R signal is driven, a current flows to the light source unit 42 and the light source unit 42 emits light. When a CIS_LED_G signal is driven, a current flows to the light source unit 43 and the light source unit 43 emits light. Furthermore, when a CIS_LED_B signal is driven, a current flows to the light source unit 44 and the light source unit 44 emits light. The light emitted from each of the light source units 42, 43, and 44 is reflected in a portion where the transfer sheet is present. However, in a portion where no transfer sheet is present, reflection does not occur, so that pixels in the corresponding portion inside the light-receiving unit 41 do not receive light.

The light-receiving unit 41 accumulates light during one cycle of the input CIS_LSYNC signal. When the CIS_LSYNC signal is asserted (becomes active), a voltage (electrical signal) equivalent to the amount of the accumulated light is stored in the shift register unit 40, the light accumulated in the respective pixels is reset, and light accumulation is started over again. In the example of FIG. 2, a plurality of electrical signals (which are equivalent to data for edge detection and may be referred to as "pixel data") corresponding one-to-one to a plurality of pixels (photoelectric conversion element pixels) included in the light-receiving unit 41 are divided into three pieces. Each of the divided three electrical signal groups (sets of one or more electrical signals) is stored in any one of the shift registers 71, 72, and 73.

In the following description, an electrical signal group representative of a set of one or more electrical signals stored in the shift register 71 may be referred to as a "first electrical signal group." An electrical signal group representative of a set of one or more electrical signals stored in the shift register 72 may be referred to as a "second electrical signal group," and an electrical signal group representative of a set of one or more electrical signals stored in the shift register 73 may be referred to as a "third electrical signal group." Moreover, among the plurality of pixels included in the light-receiving unit 41, a set of a plurality of pixels corresponding one-to-one to the plurality of electrical signals that constitute the first electrical signal group may be referred to as a "first pixel group." A set of a plurality of pixels corresponding one-to-one to the plurality of electrical signals that constitute the second electrical signal group may be referred to as a "second pixel group," and a set of a plurality of pixels corresponding one-to-one to the plurality of electrical signals that constitute the third electrical signal group may be referred to as a "third pixel group."

Figure 3:
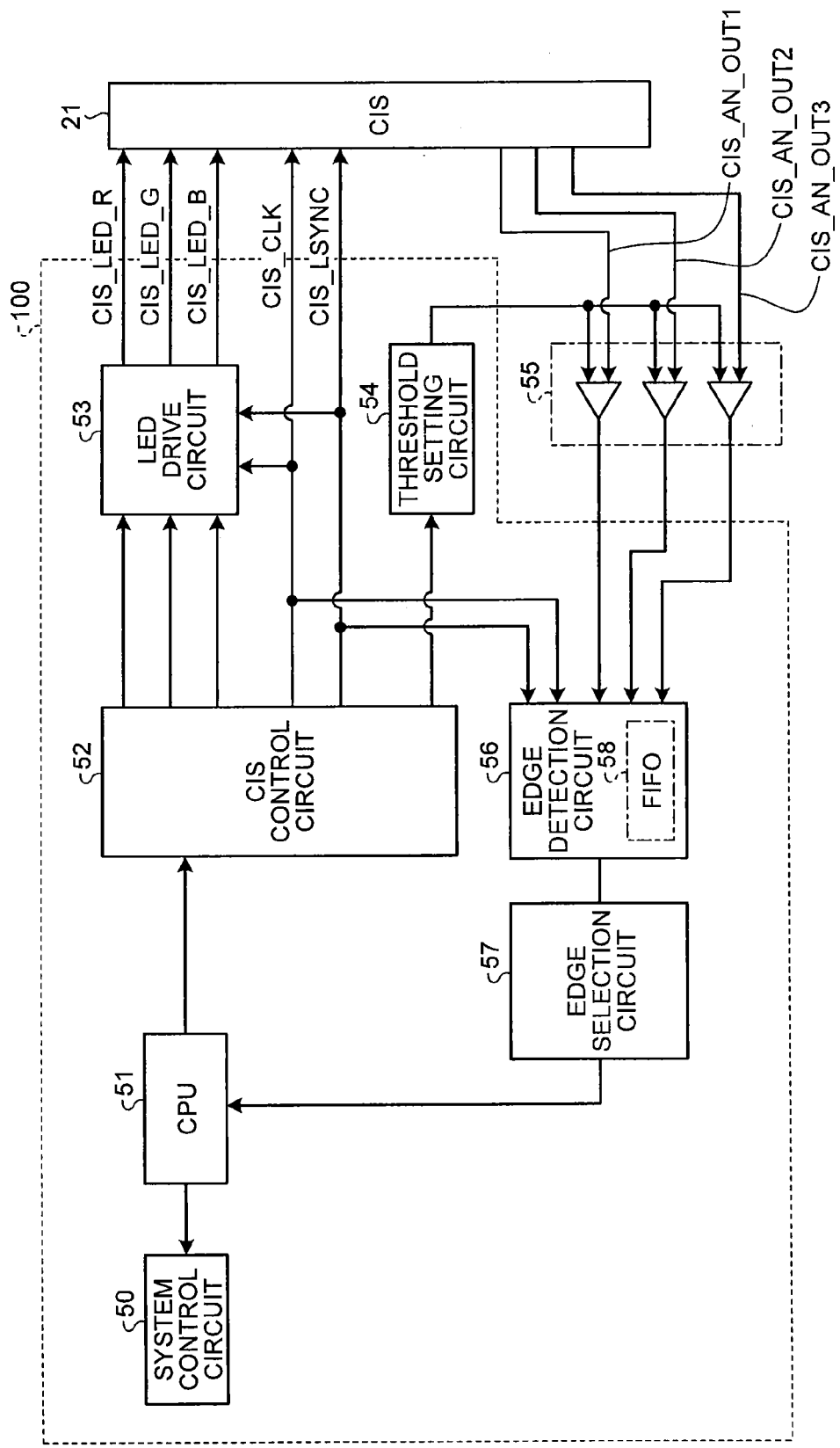
FIG. 3 is a diagram illustrating one example of the configuration of a control board controlling the CIS.

In synchronization with the input CIS_CLK signal (clock signal), the shift register unit 40 sends out pixel data (electrical signals) stored in the respective shift registers (71, 72, 73) one pixel data piece at a time as an analog signal via output units (81, 82, 83). In the example of FIG. 3, the pixel data stored in the shift register 71 is sent out one by one as a CIS_AN_OUT1 signal via the output unit 81. The pixel data stored in the shift register 72 is sent out one by one as a CIS_AN_OUT2 signal via the output unit 82. The pixel data stored in the shift register 73 is sent out one by one as a CIS_AN_OUT3 signal via the output unit 83. Here, the CIS_AN_OUT1 signal, the CIS_AN_OUT2 signal, and the CIS_AN_OUT3 signal are sent out in parallel.

FIG. 3 illustrates one example of the configuration of a control board 100 that controls the CIS 21. In addition to the control board 100 and the CIS 21, FIG. 3 illustrates a comparator 55 that inputs values (which may be referred to as "output values" in the following description) into the control board 100, the values being obtained by binarizing the pixel data (CIS_AN_OUT1 signal, CIS_AN_OUT2 signal, CIS_AN_OUT3 signal) output by the CIS 21. Although omitted in FIG. 1, the image forming apparatus 1 incorporates the control board 100 and the comparator 55.

As illustrated in FIG. 3, the control board 100 includes a system control circuit 50, a CPU 51, a CIS control circuit 52, an LED drive circuit 53, a threshold setting circuit 54, an edge detection circuit 56, and an edge selection circuit 57.

Once printing operation is started, the CPU 51 performs setting of the CIS control circuit 52 for reading data from the CIS 21. In accordance with the set contents, the CIS control circuit 52 sends out a reference clock CIS_CLK signal for reading pixel data (electrical signal) from the CIS 21 and a CIS_LSYNC signal for determining charge storage time in the CIS 21 to the CIS 21. The CIS control circuit 52 also sends out PWM signals to the LED drive circuit 53 in order to set values of the currents to be passed to the light source units 42, 43, and 44 (which may be hereinafter referred to as "LEDs") of the CIS 21. The CIS control circuit 52 also sends out a PWM signal to the threshold setting circuit 54 in order to generate a comparison reference voltage used by the comparator 55 to binarize each of the CIS_AN_OUT1 signal, the CIS_AN_OUT2 signal, and the CIS_AN_OUT3 signal output in parallel from the CIS 21.

The LED drive circuit 53 which received the PWM signals from the CIS control circuit 52 generates DC voltages on the basis of the received PWM signals, and uses the DC voltages as reference voltages for the currents to be passed to the LEDs of the CIS 21. The threshold setting circuit 54 which received the PWM signal from the CIS control circuit 52 generates a DC voltage on the basis of the PWM signal, and uses the DC voltage as a comparison reference voltage of the comparator 55.

When it is time to detect the edge of the transfer sheet (paper sheet) after completion of the above-stated processing, the CPU 51 instructs start of edge detection to the CIS control circuit 52. The CIS control circuit 52 which received the instruction to start edge detection sends out control signals to turn on the LEDs of the CIS 21 to the LED drive circuit 53 in synchronization with the CIS_LSYNC signal. In response to the control signal, the LED drive circuit 53 turns on the LEDs of the CIS 21 for a fixed period of time. The LEDs of the CIS 21 are turned on a plurality of times in accordance with the instruction by the CPU 51.

In response to next CIS_LSYNC signal and CIS_CLK signal, the CIS 21 parallely outputs voltages (pixel data), which are equivalent to the amounts of light accumulated while the LEDs are turned on, to the comparator 55. The voltages are output, one pixel data at a time, as a CIS_AN_OUT1 signal, a CIS_AN_OUT2 signal, and a CIS_AN_OUT3 signal. These signals are binarized in the comparator 55 and input to the edge detection circuit 56. In this case, the CIS control circuit 52 instructs start of edge detection to the edge detection circuit 56 so that edge detection is executed during the period when the LEDs are turned on.

In accordance with the instruction from the CIS control circuit 52, the edge detection circuit 56 performs edge detection on the basis of the output values input one by one from the comparator 55. Hereinafter, a concrete description thereof will be given. Here, the output value binarized in the comparator 55 is expressed as "L" when no transfer sheet is present (when no transfer sheet is present at positions corresponding to the pixels which output pixel data that are output values before binarization), while the value is expressed as "H" when the transfer sheet is present. The reference character "L" designates a low level while "H" designates a high level. Moreover, the number of pixels included in the light-receiving unit 41 of the CIS 21 is set to "C." Among C pixels, a set of a 1st pixel to an A-th pixel is referred to as a first pixel group (a set of pixels whose pixel data is stored in the shift register 71). A set of an A+1st pixel to a B-th pixel is referred to as a second pixel group (a set of pixels whose pixel data is stored in the shift register 72). A set of a B+1st pixel to a C-th pixel is further referred to as a third pixel group (a set of pixels whose pixel data is stored in the shift register 73).

The edge detection circuit 56 receives input of: a plurality of output values corresponding one-to-one to the plurality of pixels that constitute the first pixel group; a plurality of output values corresponding one-to-one to the plurality of pixels that constitute the second pixel group; and a plurality of output values corresponding one-to-one to the plurality of pixels that constitute the third pixel group, the input being made in parallel and in sequence one pixel data at a time. In this example, each of the plurality of output values corresponding one-to-one to a specified number "X" of pixels (an A+1st pixel to an A+X-th pixel) counted from the top of the plurality of pixels that constitute the second pixel group is sequentially stored in a FIFO 58. In this example, each of the plurality of output values corresponding one-to-one to a specified number "X" of pixels (a B+1st pixel to a B+X-th pixel) counted from the top of the plurality of pixels that constitute the third pixel group is also sequentially stored in the FIFO 58.

In the following description, a set of the plurality of pixels (the 1st pixel to the A-th pixel) that constitute the first pixel group and the specified number "X" of pixels (the A+1st pixel to the A+X-th pixel) included in the second pixel group may be referred to as a "first line." A set of the plurality of pixels (the A+1st pixel to the B-th pixel) that constitute the second pixel group and the specified number "X" of pixels (the B+1st pixel to the B+X-th pixel) included in the third pixel group may be referred to as a "second line." The third pixel group may be referred to as a "third line."

The edge detection circuit 56 parallely executes edge detection with respect to the first line, the second line, and the third line. Now, the edge detection with reference to the first line is described as an example. When the output value indicative of "H" continues for X pixels, the edge detection circuit 56 stores a position of the pixel corresponding to the last output value, among the output values continued for X pixels, in a first register (not illustrated) corresponding to the first line as an edge detection result. When the output value indicative of "H" does not continue for X pixels, a position of the pixel (the A+X-th pixel) at the end of the first line is stored in the first register as an edge detection result.

The edge detection with respect to the second line is also similarly performed. When the output value indicative of "H" continues for X pixels, the edge detection circuit 56 stores a position of the pixel corresponding to the last output value, among the output values continued for X pixels, in a second register (not illustrated) corresponding to the second line as an edge detection result. When the output value indicative of "H" does not continue for X pixels, a position of the pixel (the B+X-th pixel) at the end of the second line is stored in the second register as an edge detection result.

The edge detection with respect to the third line is also similarly performed. When the output value indicative of "H" continues for X pixels, the edge detection circuit 56 stores a position of the pixel corresponding to the last output value, among the output values continued for X pixels, in a third register (not illustrated) corresponding to the third line as an edge detection result. When the output value indicative of "H" does not continue for X pixels, a position of the pixel (the C-th pixel) at the end of the third line is stored in the third register. In this example, it can be considered that the edge detection circuit 56 is equivalent to the "edge detection device" in the claims of the present application.

After the edge detection with respect to the first, second and third lines, the edge selection circuit 57 confirms the edge detection results in order from the first register. When the position of a pixel other than the pixel (A+X) at the end of the first line is stored in the first register, the edge selection circuit 57 selects the position of the pixel stored in the first register as the edge, regardless of the edge detection results stored in the second register and the third register.

When the position of the pixel at the end of the first line is stored in the first register, the edge selection circuit 57 confirms the edge detection result stored in the second register. When the position of a pixel other than the pixel (B+X) at the end of the second line is stored in the second register, the edge selection circuit 57 selects the position of the pixel stored in the second register as the edge, regardless of the edge detection result stored in the third register.

When the position of the pixel at the end of the second line is stored in the second register, the edge selection circuit 57 confirms the position of the pixel stored in the third register. When the position of a pixel other than the pixel (C) at the end of the third line is stored in the third register, the edge selection circuit 57 selects the position of the pixel stored in the third register as the edge. In this example, it can be considered that the edge selection circuit 57 is equivalent to the "selection device" in the claims of the present application.

The CPU 51 reads the edge detection result selected by the edge selection circuit 57. Based on the result, the CPU 51 instructs correction of a starting position of the transfer sheet to the system control circuit 50. In this example, it can be considered that the control board 100 has a function corresponding to the "detection unit" in the claims of the present application.

At least part of the function corresponding to the "detection unit" in the claims may be configured to be implemented by execution of a program. The program used in this form may be configured to be provided as a file in an installable format or an executable format. The file may be recorded on computer-readable recording media, such as CD-ROMs, flexible disks (FDs), CD-Rs, digital versatile disks (DVDs), and universal serial bus (USB) devices, or may be provided or distributed via networks, such as the Internet. Various programs may also be preinstalled in ROMs and the like and be provided in this form. In this example, it can be considered that the control board 100, the CIS 21, and the comparator 55 are equivalent to the "edge detection apparatus" in the claims of the present application.

Figure 4:
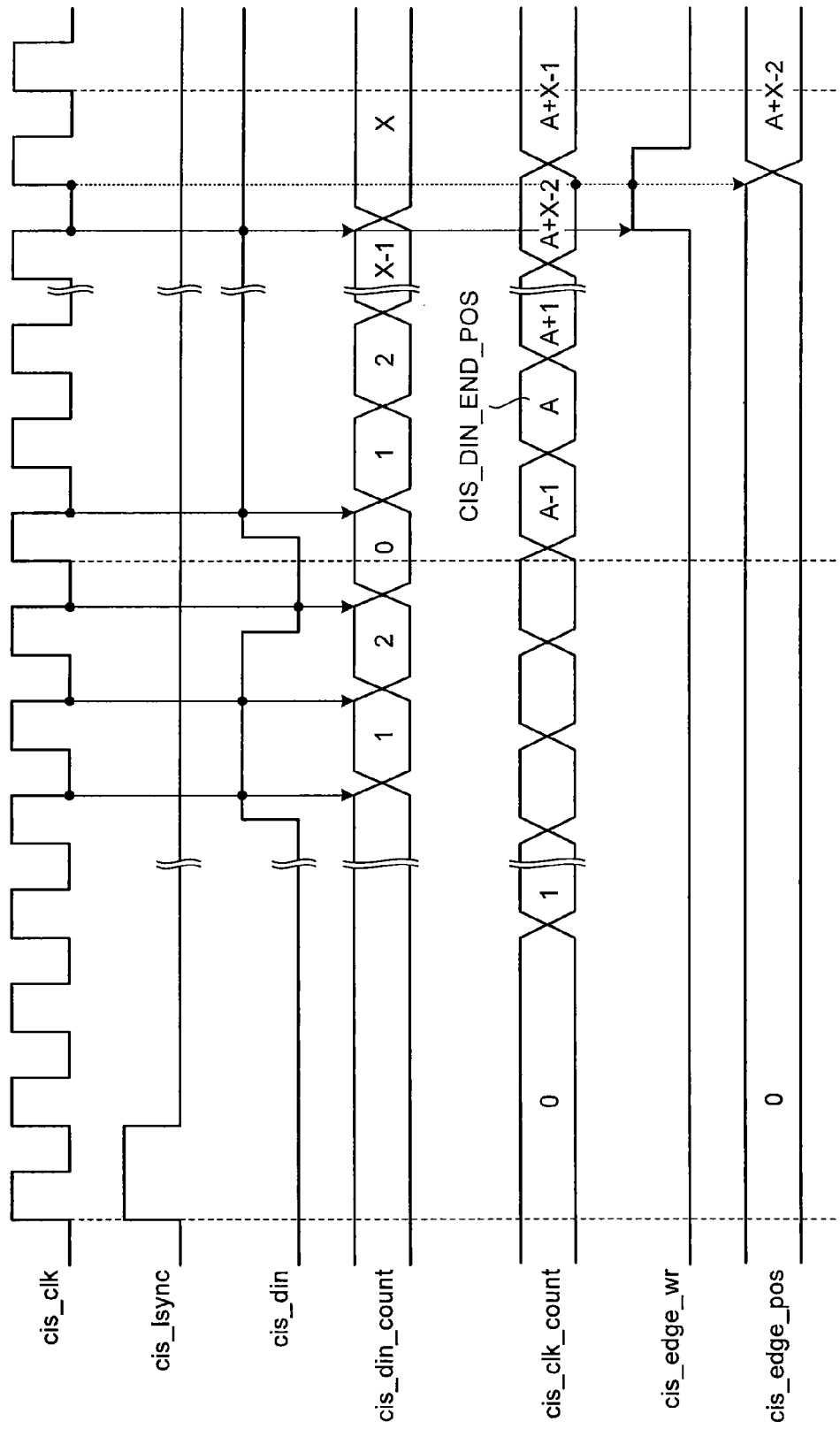
FIG. 4 is a timing chart illustrating an operation example of the CIS.

Next, an operation example of the edge detection circuit 56 will be described with reference to FIG. 4. FIG. 4 is a timing chart illustrating the operation example of the edge detection circuit 56 in the case of performing the above-stated edge detection with respect to the first line. FIG. 4 illustrates the case where output values corresponding to continuous "X" pixels starting from the A−1st pixel in the first pixel group indicate "H." The CIS control circuit 52 sends out a CIS_CLK signal and a CIS_LSYNC signal to the CIS 21. Consequently, the CIS 21 sends out a CIS_AN_OUT1 signal. The CIS_AN_OUT1 signal is binarized in the comparator 55 and is input into the edge detection circuit 56 as a CIS_DIN signal.

A first counter CIS_DIN_COUNT mounted on the edge detection circuit 56 counts up while the CIS_DIN signal indicates "H." When the CIS_DIN signal indicates "L," the first counter CIS_DIN_COUNT is cleared (initialized). A second counter CIS_CLK_COUNT mounted on the edge detection circuit 56 starts count-up at the moment when predetermined time (assumed time when an output value corresponding to the 1st pixel is input) has elapsed after the CIS_LSYNC signal was asserted. The count value of the second counter CIS_CLK_COUNT represents a pixel position at that moment. In the example of FIG. 4, when the CIS_DIN signal continuously indicates "H" for "X" pixels, the pixel position (count value of the second counter CIS_CLK_COUNT) at that time is stored in a register CIS_EDGE_POS. Here, assume the case where the edge of the transfer sheet is present in the A−1st pixel of the first pixel group. Once the count value of the second counter CIS_CLK_COUNT reaches "A," a plurality of output values corresponding one-to-one to a specified number of pixels included in the second pixel group stored in the FIFO 58 are read one pixel data at a time. Then, it is confirmed whether the CIS_DIN signal (output value) indicates "H" continuously for "X" pixels. When the CIS_DIN signal continuously indicates "H" for "X" pixels, the pixel position (count value of the second counter CIS_CLK_COUNT that is "A+X−2" in the example of FIG. 4) at that time is stored in the register CIS_EDGE_POS. The register CIS_EDGE_POS corresponds to the aforementioned first register.

In this embodiment as described in the foregoing, it can be considered that the edge is detected on the basis of a plurality of electrical signals that constitute the n-th (n≥1) electrical signal group obtained by dividing the plurality of electrical signals (pixel data) corresponding one-to-one to the plurality of pixels, and a specified number of the electrical signals counted from a top of the plurality of electrical signals that constitute the n+1st electrical signal group. This makes it possible to achieve such an advantageous effect that accurate edge detection can be implemented even when data for edge detection is divided and sent out.

For example, some component members may be deleted from all the component members illustrated in the embodiment. The image forming apparatus of the present invention is not limited to the electrophotographic image forming apparatus, but is also effective in ink-jet image forming apparatuses. The recording medium is not particularly limited, and various recording media may be used.

According to the present invention, accurate edge detection can be implemented even when data for edge detection is divided and sent out.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An edge detection apparatus for detecting an edge of a recording medium to be conveyed, comprising:
    a light source that irradiates the recording medium with light;
    a plurality of photoelectric conversion element pixels that are placed in a direction orthogonal to a conveyance direction of the recording medium and convert the light reflected by the recording medium into an electrical signal; and
    a detector that detects the edge of the recording medium based on a plurality of electrical signals that constitute an n-th (n≥1) electrical signal group obtained by dividing the plurality of electrical signals corresponding one-to-one to the plurality of photoelectric conversion element pixels, and a specified number of the electrical signals counted from a top of the plurality of electrical signals that constitute an n+1st electrical signal group,
    wherein the detector receives a parallel input of:
        a plurality of output values corresponding one-to-one to the plurality of electrical signals that constitute the n-th electrical signal group and being proportional to the respective electrical signals; and
        the plurality of output values corresponding one-to-one to the plurality of electrical signals that constitute the n+1st electrical signal group, and
    in detection of the edge with respect to an n-th line representative of a set of the plurality of photoelectric conversion element pixels corresponding one-to-one to each of the plurality of electrical signals that constitute the n-th electrical signal group and the specified number of electrical signals included in the n+1st electrical signal group, when the output value indicative of presence of the recording medium continues for the specified number of the photoelectric conversion element pixels, the detector detects a position of the photoelectric conversion element pixel corresponding to the last output value, among the continued output values, as the edge.

2. The edge detection apparatus according to claim 1, wherein
    the detector includes:
    an edge detection device that stores the position of the photoelectric conversion element pixel corresponding to the last output value, among the continued output values, in a register as a result of the edge detection when the output value indicative of the presence of the recording medium continues for the specified number of the photoelectric conversion element pixels, while storing a position of the photoelectric conversion element pixel at an end of the n-th line in the register as the result of the edge detection when the output value indicative of the presence of the recording medium continues for the specified number of the photoelectric conversion element pixels; and
    a selection device that selects the position of the photoelectric conversion element pixel stored in the register as the edge when the position of the photoelectric conversion element pixel stored in the register is other than the position of the photoelectric conversion element pixel at the end of the n-th line.

3. The edge detection apparatus according to claim 2, wherein
    the edge detection device receives input of the plurality of output values corresponding one-to-one to the plurality of electrical signals that constitute an n+2nd electrical signal group representative of a final stage, in parallel to the plurality of output values corresponding one-to-one to the plurality of electrical signals that constitute the n-th electrical signal group, and the plurality of output values corresponding one-to-one to the plurality of electrical signals that constitute the n+1st electrical signal group, and
    the edge detection device parallelly performs:
    detection of the edge with respect to the n-th line;
    detection of the edge with respect to an n+st line representative of a set of the plurality of photoelectric conversion element pixels corresponding one-to-one to each of the plurality of electrical signals that constitute the n+1st electrical signal group and the specified number of electrical signals included in the n+2nd electrical signal group; and
    detection of the edge with respect to an n+2nd line representative of a set of the plurality of photoelectric conversion element pixels corresponding one-to-one to the plurality of electrical signals that constitute the n+2nd electrical signal group.

4. The edge detection apparatus according to claim 3, wherein
    the register includes an n-th register corresponding to the n-th line, an n+1st register corresponding to the n+1st line, and an n+2nd register corresponding to the n+2nd line, and the edge detection device stores the result of the edge detection with respect to the n-th line in the n-th register, stores the result of the edge detection with respect to the n+1st line in the n+1st register, and stores the result of the edge detection with respect to the n+2nd line in the n+2nd register.

5. The edge detection apparatus according to claim 4, wherein
when the position of the photoelectric conversion element pixel other than the photoelectric conversion element pixel at the end of the n-th line is stored in the n-th register, the selection device selects the position of the photoelectric conversion element pixel stored in the n-th register as the edge, regardless of the results of the edge detection stored in the n+1st and n+2nd registers.

6. The edge detection apparatus according to claim 5, wherein
when the position of the photoelectric conversion element pixel at the end of the n-th line is stored in the n-th register, the selection device confirms the result of the edge detection stored in the n+1st register, and when the position of the photoelectric conversion element pixel other than the photoelectric conversion element pixel at the end of the n+1st line is stored in the n+1st register, the selection device selects the position of the photoelectric conversion element pixel stored in the n+1st register as the edge, regardless of the result of the edge detection stored in the n+2nd register.

7. The edge detection apparatus according to claim 6, wherein
when the position of the photoelectric conversion element pixel at the end of the n+1st line is stored in the n+1st register, the selection device confirms the result of the edge detection stored in the n+2nd register, and when the position of the photoelectric conversion element pixel other than the photoelectric conversion element pixel at the end of the n+2nd line is stored in the n+2nd register, the selection device selects the position of the photoelectric conversion element pixel stored in the n+2nd register as the edge.

8. An image forming apparatus, comprising the edge detection apparatus according to claim 1.

9. An edge detecting method for detecting an edge of a recording medium to be conveyed, the method comprising:
detecting the edge of the recording medium by a detector based on a plurality of electrical signals that constitute an n-th ($n \geq 1$) electrical signal group, and a specified number of the electrical signals counted from a top of the plurality of electrical signals that constitute an n+1st electrical signal group, each of the electrical signal groups being obtained by dividing the plurality of electrical signals corresponding one-to-one to a plurality of photoelectric conversion element pixels, the plurality of photoelectric conversion element pixels being placed in a direction orthogonal to a conveyance direction of the recording medium to convert light of a light source emitted to and reflected by the recording medium into an electrical signal,
wherein the detector receives a parallel input of:
a plurality of output values corresponding one-to-one to the plurality of electrical signals that constitute the n-th electrical signal group and being proportional to the respective electrical signals; and
the plurality of output values corresponding one-to-one to the plurality of electrical signals that constitute the n+1st electrical signal group, and
in detection of the edge with respect to an n-th line representative of a set of the plurality of photoelectric conversion element pixels corresponding one-to-one to each of the plurality of electrical signals that constitute the n-th electrical signal group and the specified number of electrical signals included in the n+1st electrical signal group, when the output value indicative of presence of the recording medium continues for the specified number of the photoelectric conversion element pixels, the detector detects a position of the photoelectric conversion element pixel corresponding to the last output value, among the continued output values, as the edge.

* * * * *